US010920569B2

(12) United States Patent
Mandal (10) Patent No.: US 10,920,569 B2
(45) Date of Patent: Feb. 16, 2021

(54) ACOUSTIC METHOD AND APPARATUS FOR CEMENT BOND EVALUATION THROUGH TUBING

(71) Applicant: Halliburton Energy Services, Inc., Houston, TX (US)

(72) Inventor: Batakrishna Mandal, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/336,863

(22) PCT Filed: Jun. 22, 2018

(86) PCT No.: PCT/US2018/038998
§ 371 (c)(1),
(2) Date: Mar. 26, 2019

(87) PCT Pub. No.: WO2019/018100
PCT Pub. Date: Jan. 24, 2019

(65) Prior Publication Data
US 2020/0116007 A1 Apr. 16, 2020

Related U.S. Application Data

(60) Provisional application No. 62/533,521, filed on Jul. 17, 2017.

(51) Int. Cl.
*G01V 1/50* (2006.01)
*E21B 47/005* (2012.01)
*G01V 1/46* (2006.01)

(52) U.S. Cl.
CPC .............. *E21B 47/005* (2020.05); *G01V 1/46* (2013.01)

(58) Field of Classification Search
CPC ............................. E21B 47/0005; G01V 1/46
See application file for complete search history.

(56) References Cited

U.S. PATENT DOCUMENTS 4,674,067 A * 6/1987 Zemanek, Jr. ........ B06B 1/0655
367/25
4,709,357 A * 11/1987 Maki, Jr. .................. G01V 1/48
181/105

(Continued)

FOREIGN PATENT DOCUMENTS

| WO | 2016040133 | 3/2016 |
| WO | 2016105206 | 6/2016 |
| WO | 2016187240 | 11/2016 |

OTHER PUBLICATIONS

ISRWO International Search Report and Written Opinion for PCT/US2018/038998 dated Oct. 30, 2018.

*Primary Examiner* — Munear T Akki
(74) *Attorney, Agent, or Firm* — John Wustenberg; C. Tumey Law Group PLLC (57) ABSTRACT

A method and system for determining cement bonding. The method may comprise disposing an acoustic logging tool in a wellbore, wherein the acoustic logging tool comprises a transmitter and a receiver, broadcasting a shaped signal with the transmitter such that fluid between concentric pipes disposed in the wellbore is excited, recording a reverberating signal with the receiver, processing the reverberating signal with an information handling system, and determining presence of a material outside an outermost of the concentric pipes. A well measurement system for determining cement bonding may comprise an acoustic logging tool. The acoustic logging tool may comprise at least one transmitter, wherein the at least one transmitter is configured to broadcast a shaped signal, and at least one receiver, wherein the at least one receiver is configured to record a reverberating (Continued)

signal. The acoustic logging tool may also comprise a conveyance and an information handling system.

20 Claims, 6 Drawing Sheets (56) References Cited

U.S. PATENT DOCUMENTS

| | | | | |
|---|---|---|---|---|
| 5,036,496 | A * | 7/1991 | Rutledge | G01V 1/50 |
| | | | | 367/35 |
| 10,301,932 | B2 * | 5/2019 | Chen | E21B 47/16 |
| 2007/0070810 | A1 | 3/2007 | Hurst et al. | |
| 2009/0213689 | A1 | 8/2009 | Tello | |
| 2010/0126718 | A1 * | 5/2010 | Lilley | E21B 47/005 |
| | | | | 166/253.1 |
| 2011/0080805 | A1 | 4/2011 | Vu et al. | |
| 2013/0342077 | A1 * | 12/2013 | Lautzenhiser | G01S 7/521 |
| | | | | 310/327 |
| 2015/0034311 | A1 | 2/2015 | Tunget | |
| 2015/0168581 | A1 * | 6/2015 | Izuhara | E21B 47/0005 |
| | | | | 702/9 |
| 2015/0177404 | A1 * | 6/2015 | Pabon | G01V 1/523 |
| | | | | 367/28 |
| 2015/0338378 | A1 * | 11/2015 | Lu | E21B 47/16 |
| | | | | 73/632 |
| 2016/0018549 | A1 * | 1/2016 | Tracadas | G01V 1/48 |
| | | | | 367/35 |
| 2017/0114627 | A1 * | 4/2017 | Mandal | E21B 47/0005 |
| 2017/0342817 | A1 * | 11/2017 | Tello | E21B 17/1078 |
| 2017/0350999 | A1 * | 12/2017 | Merciu | E21B 47/00 |

* cited by examiner

ACOUSTIC METHOD AND APPARATUS FOR CEMENT BOND EVALUATION THROUGH TUBING

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

At the end of a well installations life, the well installation must be plugged and abandoned. Understanding cement bond integrity to a pipe string and/or casing string may be beneficial in determining how to plug the well installation. Currently, pipe strings may produce signals and/or interference waves, when excited, that may overshadow signals which may indicate cement bonding to a pipe string and/or a casing. An electromagnetic (EM) logging tool may be utilized to broadcast a shaped signal and record a reverberated signal, which may be processed to determine the material behind a pipe string and/or a casing.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying cement bonding as well as materials behind a pipe string and/or casing with an acoustic logging tool. Acoustic sensing may provide continuous in situ measurements of parameters related to cement bonding to a pipe string and/or a casing. As a result, acoustic sensing may be used in cased borehole monitoring applications. As disclosed herein, acoustic logging tools may be used to emit an acoustic signal that excites the fluid between two concentric pipes in the wellbore (e.g., between tubing and casing). The characteristic decay of the multiple bound or reverberation signal between the concentric pipes may be observed, for example, from receiver measurements on the acoustic logging tool. The maximum effect of the reverberation signal may be found when the transmitter and receiver are close to each other (normal incidence). Transmitter-receiver is a variable for maximizing the reverberation signal. Exciting the dominant frequency of reverberation due to the fluid path between the concentric pipes may also be used to obtain an optimal signal that could produce the effect of the bonded or free behind the outermost of the concentric pipes (e.g., casing). Casing resonance frequency, for example, may be used for resonating the fluid column between the concentric pipes. The acoustic logging tools may operate on a conveyance. Acoustic logging tool may include an independent power supply and may store the acquired data on memory.

Figure 1:
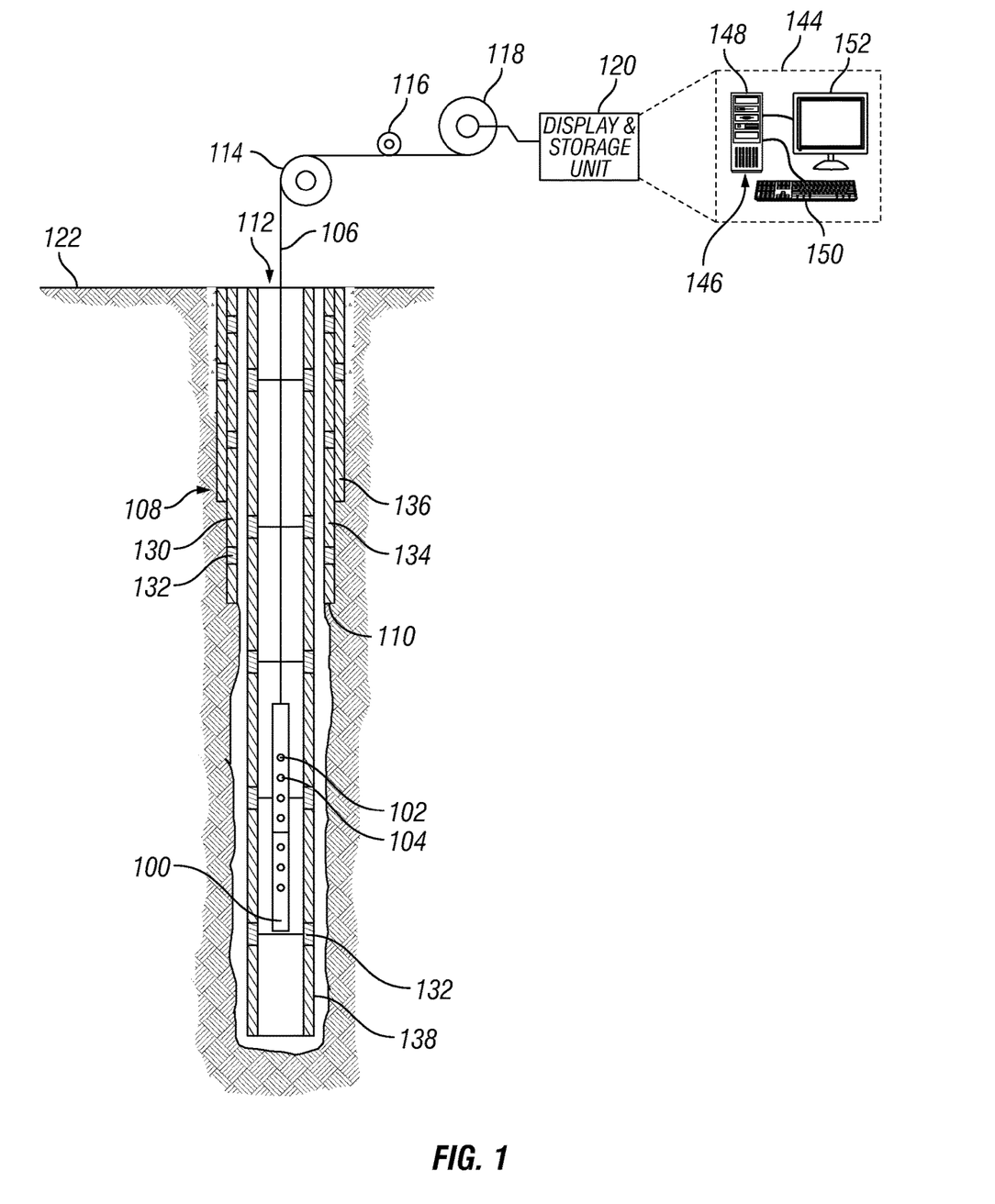
FIG. 1 illustrates a system including an acoustic logging tool.

FIG. 1 illustrates an operating environment for an acoustic logging tool 100 as disclosed herein. Acoustic logging tool 100 may comprise a transmitter 102 and/or a receiver 104. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Acoustic logging tool 100 may be used for excitation of transmitter 102. As illustrated, one or more receiver 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some embodiments, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. The transmitters 102 may include any suitable acoustic source for generating acoustic waves downhole, including, but not limited to, monopole and multipole sources (e.g., dipole, cross-dipole, quadrupole, hexapole, or higher order multi-pole transmitters). Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that may convert acoustic waves into an electric signal.

Figure 2:
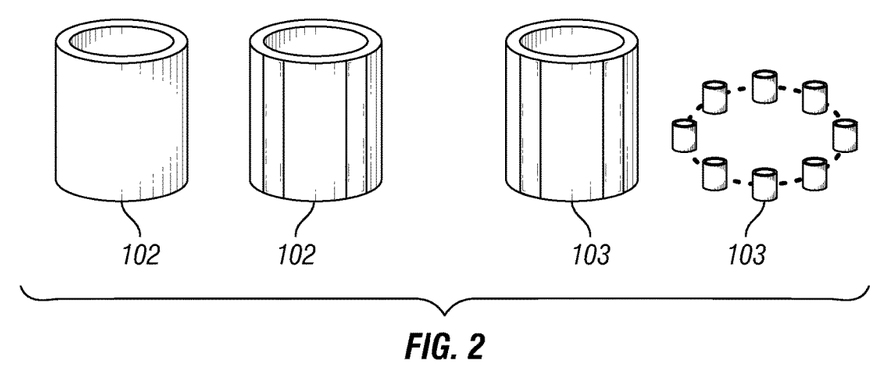
FIG. 2 illustrates an example of a transmitter and a receiver.

FIG. 2 illustrates examples of transmitter 102 and receiver 104. For example, transmitter 102 may be cylindrical and/or segmented piezoelectric tube. Receivers 104 may include a segmented piezoelectric tube, individual receiver, or azimuthal receivers, which may produce azimuthal variation of bonding behind first casing 134. It should be noted that transmitter 102 and receiver 104 may be combined into a single element with the ability to both transmit acoustic waves and receiver acoustic waves.

Referring back to FIG. 1, transmission of acoustic waves by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 3:
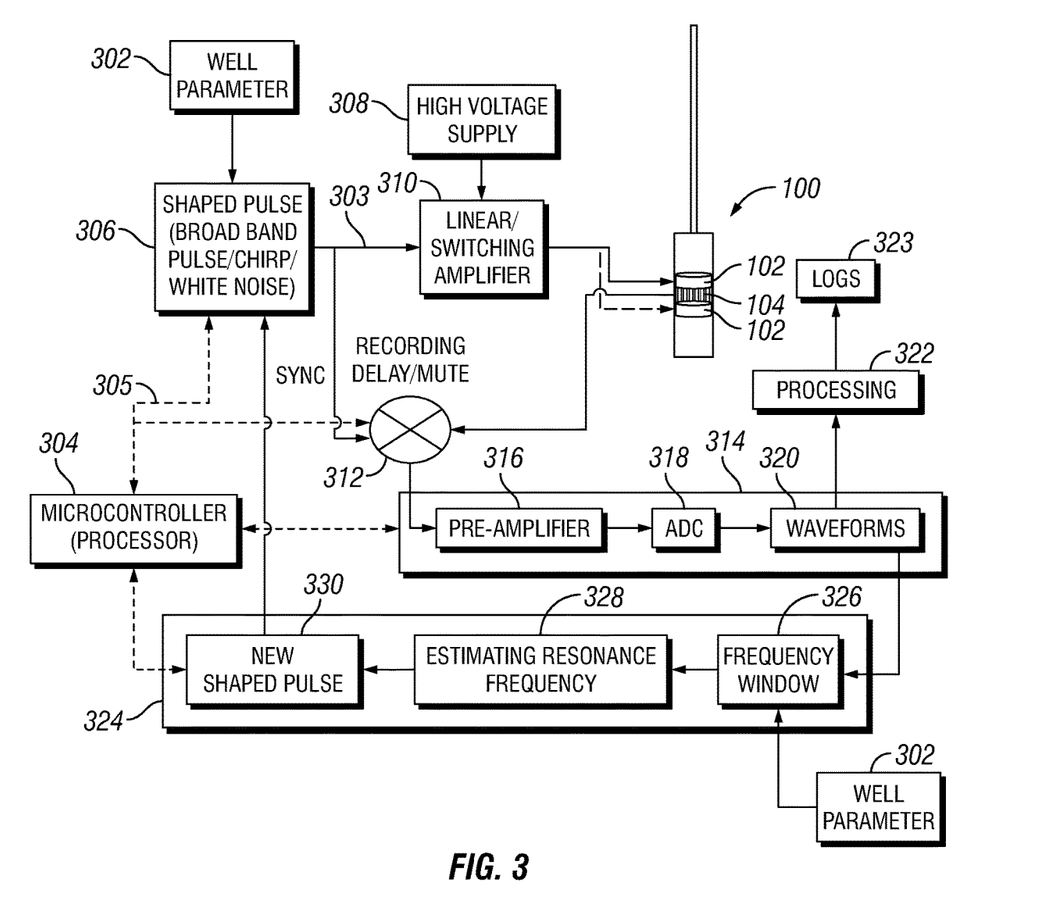
FIG. 3 illustrates a flow diagram of the movement of information and control of transmitter and/or receiver within the Acoustic logging tool.

FIG. 3 illustrates the movement of information and control of transmitter 102 and/or receiver 104 within acoustic logging tool 100. Acoustic logging tool 100 may process an input to define a well parameter 302. In examples, the components of acoustic logging tool 100 may be hardwired. As depicted, the hardwired components may be represented by a solid line 303. In alternate examples, the components may optionally communicate any suitable process to a microcontroller 304. The components communicating with microcontroller 304 may be represented by a dashed line 305. Microcontroller 304 may instruct transmitter 102 to broadcast a signal 306. Signal 306 may comprise of a shaped pulse. The shaped pulse may be optimized based on observations. To estimate the characteristic of the shaped pulse, a wide band pulse, chirp, or white noise may be used initially to estimate a suitable frequency range for casing bond information. A response from receiver 104 from the wide band pulse, chirp, and/or white noise may have characteristic frequency loss due to the multiple bounces of the different gaps between pipe string 138 (Referring to FIG. 1) and first casing 134 (Referring to FIG. 1). A feedback loop may be found in feed back module 324, which may estimate the optimized shaped pulse from the observation.

In examples, a voltage supply 308 may be implemented to provide a large supply of power to transmitter 102 and/or receiver 104. A large supply of power may be defined as about 1000 Volts. In examples, a large supply of power may range from 900 Volts to 1000 Volts or 1000 Volts to 1100 Volts. As discussed above, transmitter 102 and receiver 104 may be disposed close to each other, which may affect receiver 104 during a high voltage firing pulse when broadcasted from transmitter 102. Receiver 104 may be affect as the response recorded by receiver 104 may be clipped from pre-recorded responses by receiver 104. In some examples, receiver 104 may be disposed in between two transmitters 102 to obtain strong signal from the casing interface due to the normal incidence wave front. In alternate examples, transmitter 102 may be disposed between two receivers 104. Without limitation, receiver 104 may be disposed any suitable distance from transmitter 102. In examples, a suitable distance may be between from about one inch to about three feet. For example, distance between receiver 104 and transmitter 102 may be one inch where a piezo cylinder for independent transmitter 102 and receiver 104 may be one inch. In other examples, a distance of zero inches between a receiver 104 and transmitter 102 may be achieved when a receiver 104 is disposed between two transmitters 102 or vice versa.

As illustrated in FIG. 3, an amplifier 310 may be employed on acoustic logging tool 100 that affects signal 306 of the shaped pulse produced by transmitter 102. Amplifier 310 may be supplied by a high voltage from voltage supply 308. Without limitations, amplifier 310 may be linear, switching, and/or combinations thereof.

In examples, a delay and mute mechanism 312 may be implemented at the beginning of broadcasting to prevent saturation of pre-amplifier 316. The delay provided by delay and mute mechanism 312 may depend on the duration of the broadcasting of the shaped pulse as well as the geometry of wellbore 110 (Referring to FIG. 1). Signal 306 processed by the delay and mute mechanism 312 may be sent to module 314.

Module 314 may comprise of a pre-amplifier 316, an analog-to-digital converter (ADC) 318. It should be noted that the output from ADC 318 may produce a digital sequence that may represent waveform 320. Without limitation, there may be a plurality of waveforms 320 that may be transmitted from ADC 318. Waveforms 320 may be stored in a tool memory and/or transmitted up-hole for real-time processing and/or post processing. For example, observed digital waveforms from receiver 104 for each source firing with length 10-50 ms may be stored in the memory and sent uphole for processing. It should be noted that waveforms 320 may be processed downhole or uphole in real time. Additionally, waveforms may be used for further analysis from memory data for identification of fluids/solids disposed behind pipe string 138 and/or any casing in casing string 108 (e.g., referring to FIG. 1). Acoustic logging tool 100 may produce a plurality of logs 322 as a result of processing 321 of the plurality of waveforms 320. This may be performed for each individual azimuthal response recorded by receiver 104 to determine the eccentricity of pipe string 138 in first casing 134 (e.g., referring to FIG. 1). In examples, an optimal firing pulse may be estimated in-situ from observations.

In alternate examples, after the plurality of waveforms 320 is obtained, a feed back module 324 may be implemented. Feed back module 324 may comprise of selecting a frequency window 326 based on a given well parameter 302, estimate a resonance frequency 328, and generating a new shaped pulse 330. In examples, feed back module 324 may function to provide feed back loop to optimize the plurality of waveforms 320 with the plurality of new shaped pulses. Optimizing the new shaped pulse may obtain a clear response from the bond integrity behind casing 134 (i.e., referring to FIG. 1). Well parameters may be used for selecting frequency window 326 of new shaped pulse 330. For example, if pipe string 138 and first casing 134 are known, the minimum gap and maximum gap between pipe string 138 and casing 134 may be limited. Thus, the most resonance frequency due to the gap between pipe string 138 and first casing 134 may be limited. It should also be noted, without limitation, well parameters may include fluid properties such as velocity, density, attenuation, and/or any combination thereof. From these well parameters feed back module 324 may perform the function of estimating resonance frequency that may fit within frequency window 326 based on well parameters. An appropriate new shaped pulse 330 may then be formed. New shaped pulse 330 may be sent through delay and mute mechanism 312, to module 314, and then either to be processed or back to feed back module 324 to repeat a given number of times until a threshold is reached.

Figure 4:
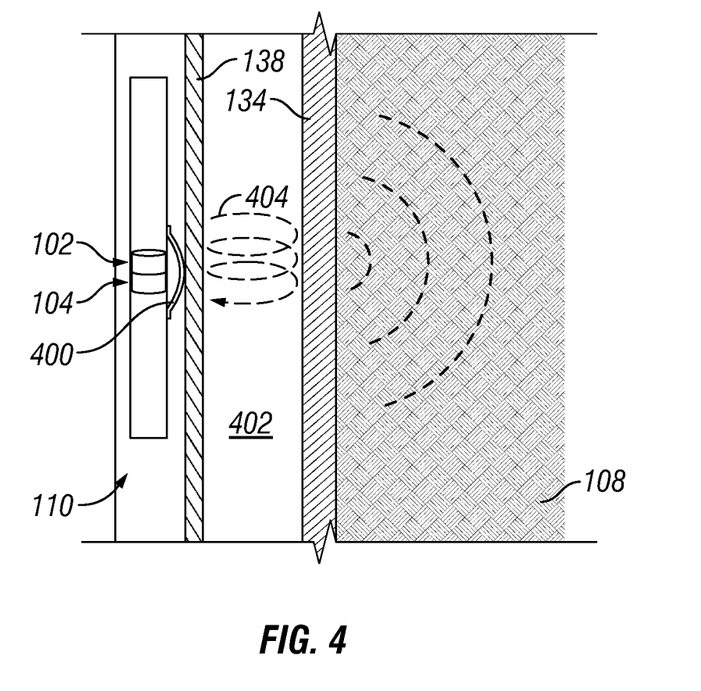
FIG. 4 illustrates the Acoustic logging tool broadcasting a shaped signal.

FIG. 4 illustrates acoustic logging tool 100 disposed in wellbore 110, wherein transmitter 102 may broadcast a shaped signal 400 through pipe string 138, which may excite a fluid 402 that may be disposed between pipe string 138 and first casing 134. It should be noted that fluid 402 may comprise "mud" disposed downhole for drilling operations. The characteristic decay of the multiple bounce and/or reverberation of shaped signal 400 between pipe string 138 and first casing 134 may be recorded by receiver 104. The maximum effect of reverberation signal 404 may be found when transmitter 102 and receiver 104 may be disposed close to each other, as discussed above. The distance between transmitter 102 and receiver 104 may be important to maximize reverberation signal 404. Exciting the dominant frequency of reverberation signal 404 due to fluid 402 between pipe string 138 and first casing 134 may also be another feature for optimizing reverberation signal 404.

Reverberation signal 404 may be processed to further determine if a material 406 (i.e., cement) may be bonded to first casing 134 and formation 408. In examples, reverberation signal 404 may be processed to further determine if a material 406 may be bonded to first casing 134 and second casing 136 (e.g., referring to FIG. 1) or if material 406 bonded to any outer casing to formation 408. If no bonding has occurred, there may be a strong signal detected. It should be noted, that while cement is referred to, other solid material may be used in place of cement for bonding. For this disclosure cement may further include all solid material that may be disposable downhole behind first casing 134, second casing 136, or any other casing.

Figure 5:
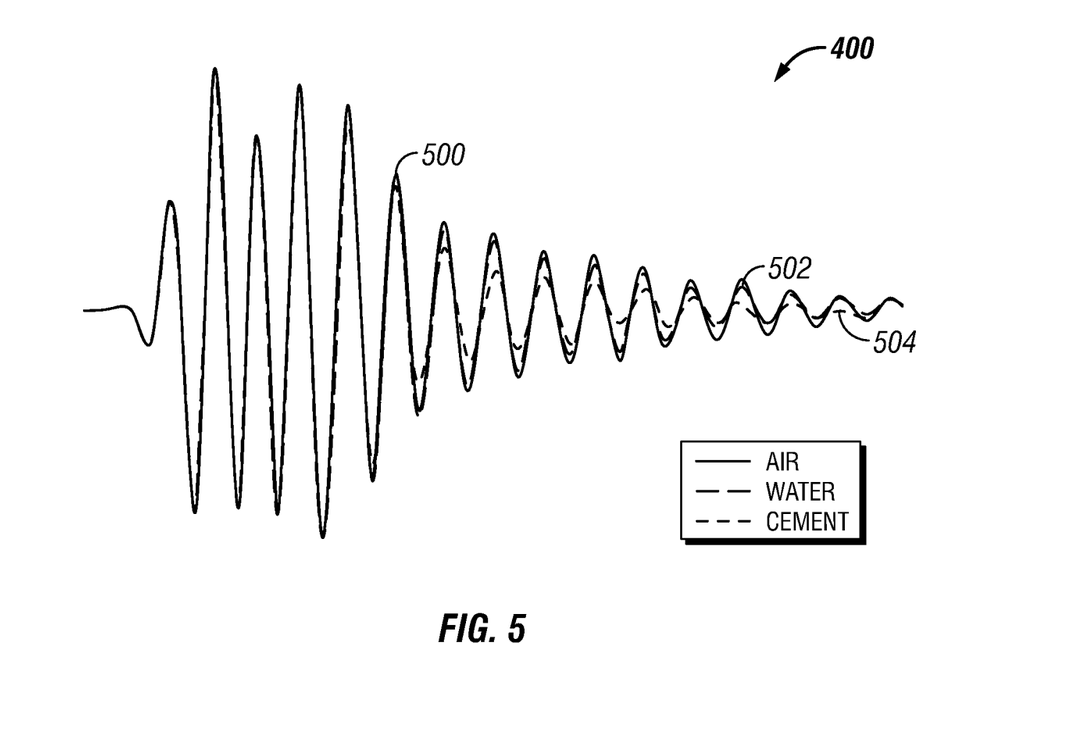
FIG. 5 illustrates a plurality of recorded reverberated signals.

FIG. 5 illustrates broadcasted shaped signal 400, which may be recorded as air reverberation signal 500, borehole fluid reverberation signal 502, or cement reverberation signal 504. It should be noted that the energy of resonance window of the observed waveform may differ from air reverberation signal 500, borehole fluid reverberation signal 502, or cement reverberation signal 504. For example, air reverberation signal 500 and borehole fluid reverberation signal 502 may have a higher energy of resonance window than cement reverberation signal 504. This may be due to pipe string 138, or any casing such as first casing 134, which may resonant more freely in fluid than with cement behind it. FIG. 5 illustrates data where air reverberation signal 500 comprises the highest response, borehole fluid reverberation signal 502 comprises a lower response, and cement reverberation signal 504 comprises the lowest response. Currently, broadcasted shaped signal 400 may include a resonance frequency that may depend on the thickness or gap between pipe string 138 and first casing 134. This may be imitated for resonating a fluid 402, referring FIG. 4, between pipe string 138 and first casing 134 (Referring to FIG. 4). Various shaped frequency firing pulses may be utilized to determine the properties between pipe string 138 and first casing 134. Additionally, various shaped frequency firing pluses may determine the material behind first casing 134 through pipe string 138. FIG. 5 shows the comparison of the recorded responses, which illustrates the differences in amplitude of reverberation signals 404, referring to FIG. 4, which may delineate between what materials may be outside first casing 134, second casing 136 (not illustrated), and/or any other casing. For example, air may include more "ringing" (hence amplitude) than the water.

Figure 6:
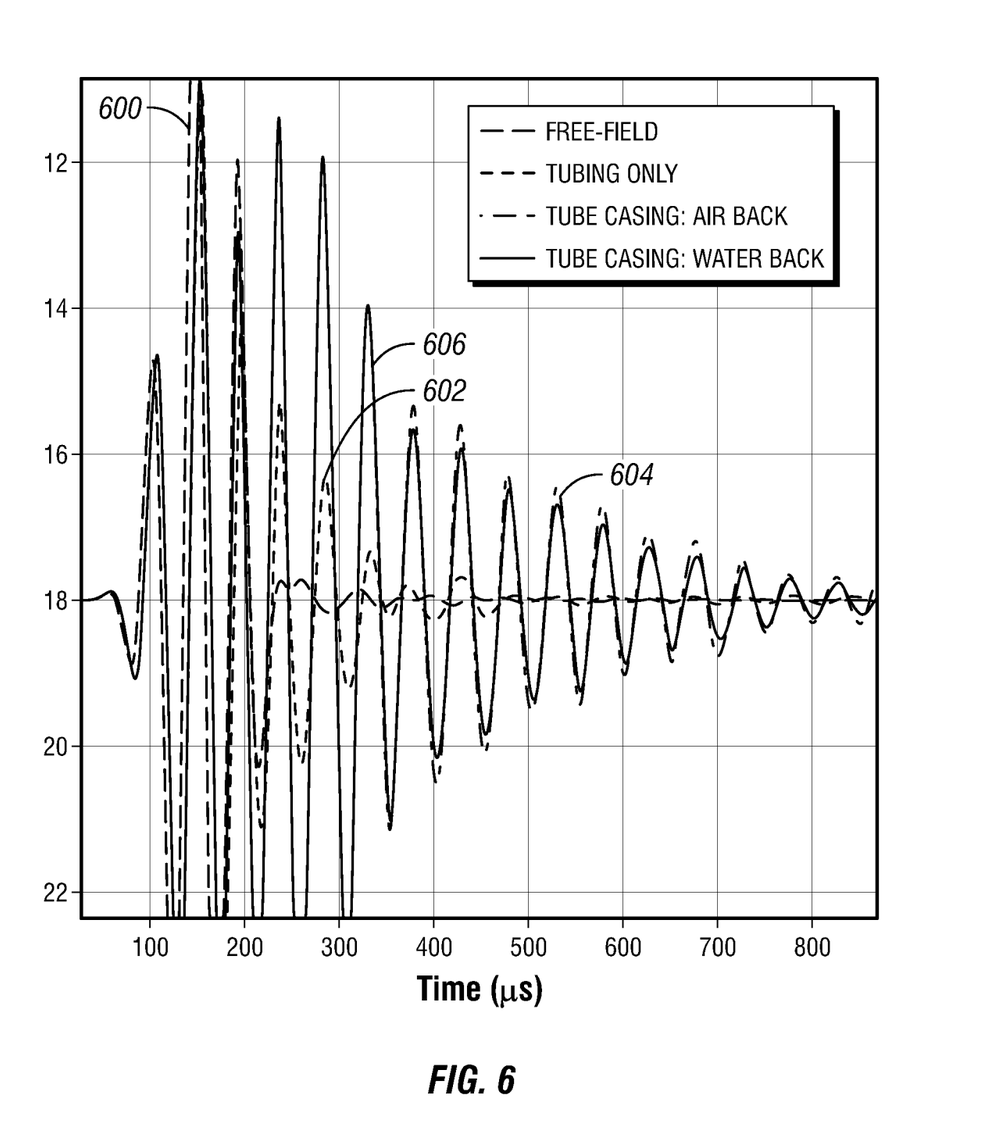
FIG. 6 illustrates another example of a plurality of recorded reverberated signals.

FIG. 6 illustrates another example of a recorded reverberation signals 404 (Referring to FIG. 4). As illustrated, a free field signal (where no pipe string 138 or no first casing 134) 600 includes higher amplitude than just a tubing only signal 602. Air back signal 604 may indicate air behind first casing 134, referring to FIG. 1, and have a larger amplitude than water back signal 606, which may indicate water behind first casing 134, referring to FIG. 1.

Figure 7:
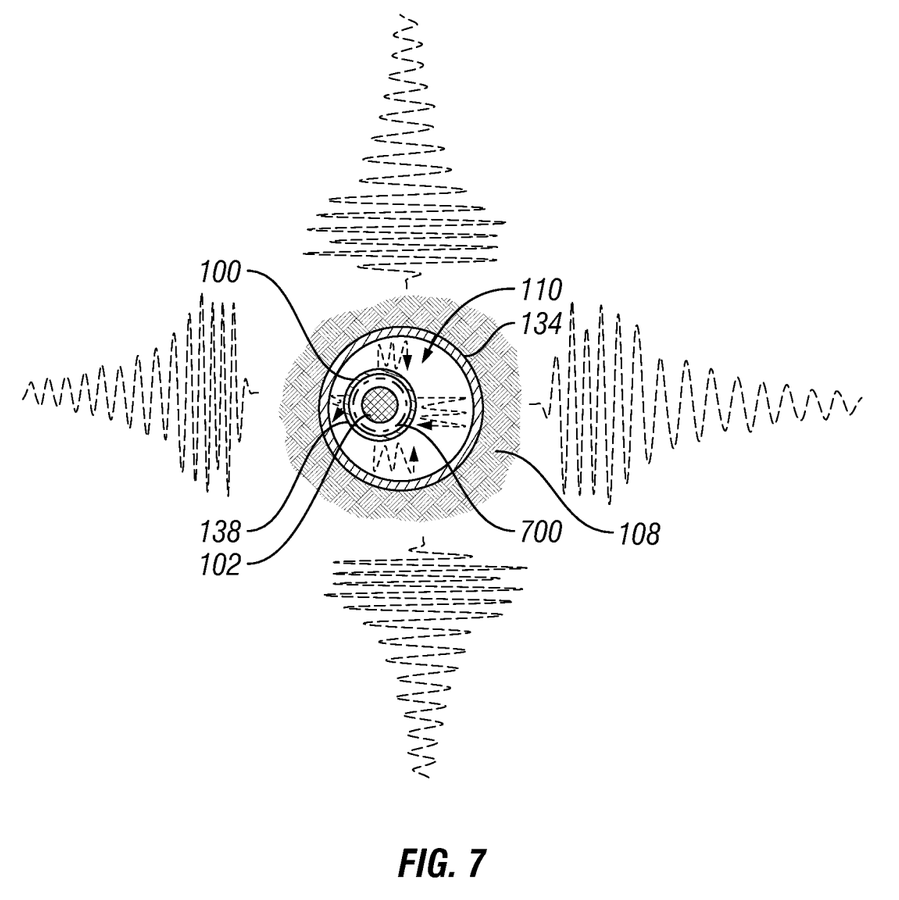
FIG. 7 illustrates a top down perspective of a wellbore in which Acoustic logging tool is disposed and broadcasting a signal.

FIG. 7 illustrates a top down view of acoustic logging tool 100 dispose in pipe string 138, which may be disposed in first casing 134. As illustrated, transmitter 102 (Referring to FIG. 1) may broadcast in any direction from acoustic logging tool 100. Often, pipe string 138 may not be placed at the center of first casing 134. Thus, the annulus width, distance between pipe string 138 and first casing 134, may change azimuthally. For this, a characteristic firing pulse 700 may be broadcasted and recorded to determine a signal for detecting a bond of material 406 to first casing 134 and formation 408. Characteristic firing pulse 700 may be designed adaptably based on in-situ observations or pre-defined pulse based on the geometry of wellbore 110. Thus, acoustic logging tool 100 may include a transmitter 102 with programmable firing wavelet and associated receiver 104. Transmitter 102 may be a monopole or multipolar radiation source and receiver 104 could also be monopole or multipolar receiving system. Since transmitter 102 and receiver 104 may be disposed close to each other to obtain an optimized signal, there may be a timing mechanism of receiver muting system which may help increase a dynamic range of a recorded signal, which may determine the material behind first casing 134. For example, when transmitter 102 is firing, the energy emitting from transmitter 102 may not be recorded as it may saturate the amplifier 316 in FIG. 3. Muting the receiver system during broadcasting transmitter 102 may prevent saturation.

Figure 8:
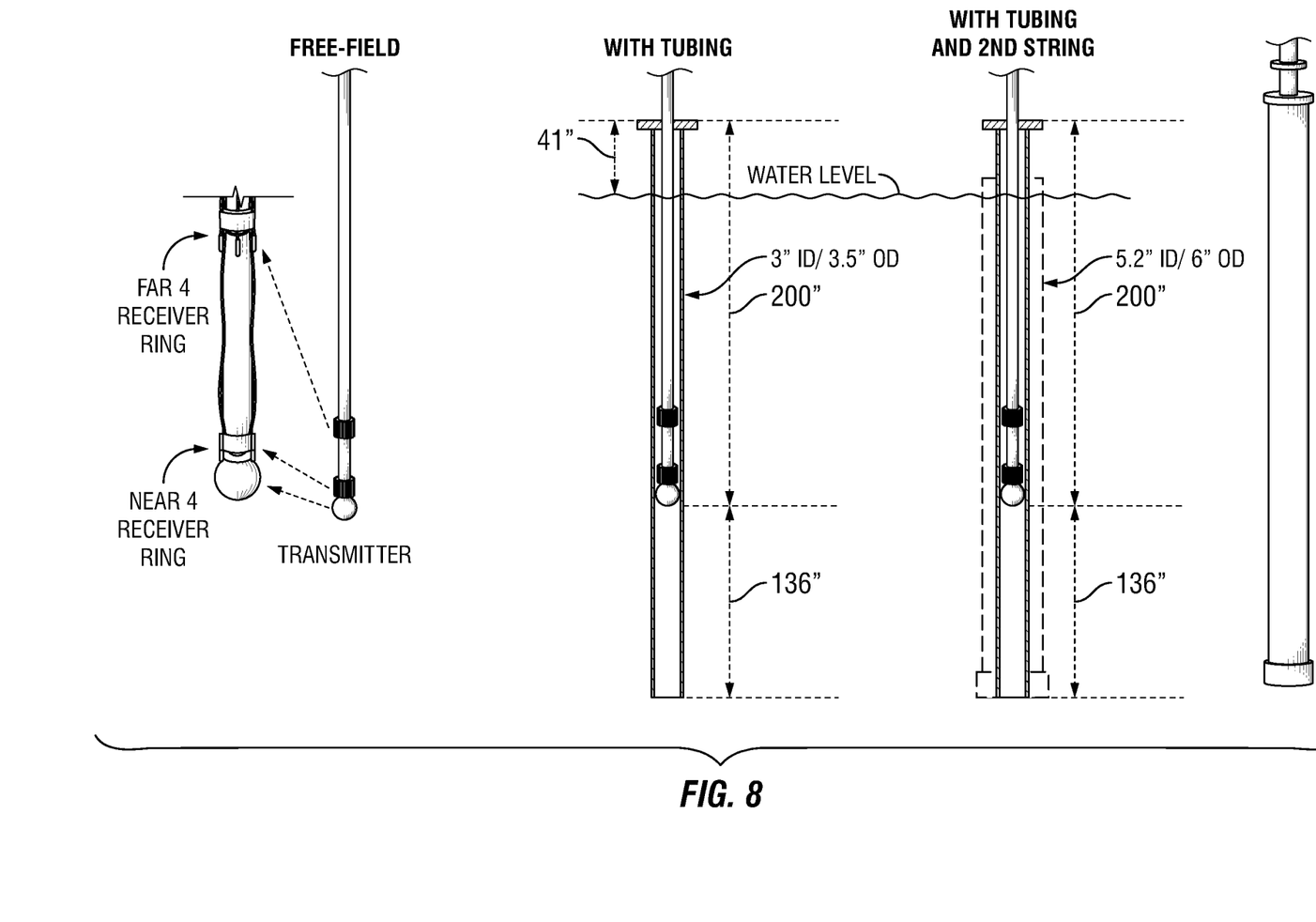
FIG. 8 illustrates an example experimental configuration for evaluation of cement bonding.

To evaluate the disclosed technique for cement bond evaluation, various tests were conducted using a transmitter-receiver configuration as shown in FIG. 8. The transmitter was a conventional transmitter (SN 1459) with a frequency range of range of 2 kHz-40 kHz. The receivers were conventional calibrated hydrophones (B&K 8103) with a frequency response of 1 kHz-100 kHz. To obtain azimuthal response, four hydrophones were grouped in receiver rings in the sample plane with 90° apart. One receiver rings of four receivers were placed closer to the transmitter (to get normal incidence) and another receiver ring of four receivers was placed far offset (2 ft.). Various shaped frequency firing pulses are used to find the effect of the material behind an outermost pipe through an inner pipe (e.g., behind casing through tubing). FIG. 6 shows the comparison of the responses at the near receiver for Free field (when the transmitter and receiver is surrounded only water (tank)), Transmitter and receiver in the tube (3" ID and 3.5" OD), Transmitter and receiver with the tubing and casing (5.2" ID and 6" OD) in the water or hanging in the air. FIG. 6 clearly differentiates the amplitude of the reverberation signals to delineate between the water and the air outside the casing. Air should have more ringing (hence amplitude) than the water The systems and methods disclosed herein may include any of the various features of the systems and methods disclosed herein, including one or more of the following statements.

Statement 1: A method for determining cement bonding, comprising: disposing an acoustic logging tool in a wellbore, wherein the acoustic logging tool comprises a transmitter and a receiver; broadcasting a shaped signal with the transmitter such that fluid between concentric pipes disposed in the wellbore is excited; recording a reverberating signal with the receiver; processing the reverberating signal with an information handling system; and determining presence of a material outside an outermost of the concentric pipes.

Statement 2: The method of statement 1, wherein the material comprises air, water, borehole fluid, gas, oil, or combinations thereof.

Statement 3: The method of any of the preceding statements, wherein the receiver is a segmented piezoelectric tube or an individual receiver.

Statement 4: The method of any of the preceding statements, wherein the transmitter is cylindrical or a segmented piezoelectric tube.

Statement 5: The method of any of the preceding statements, wherein the transmitter and the receiver are a single element.

Statement 6: The method of any of the preceding statements, wherein the reverberating signal is an air reverberation signal and wherein the air reverberation signal indicates air behind a first casing.

Statement 7: The method of any of the preceding statements, wherein the reverberating signal is a borehole fluid reverberation signal and wherein the borehole fluid reverberation signal indicates fluid behind a first casing.

Statement 8: The method of any of the preceding statements, wherein the reverberating signal is a cement reverberation signal and wherein the cement reverberation signal indicates cement behind a first casing.

Statement 9: The method of any of the preceding statements, further comprising optimizing the reverberating signal through a feed back loop.

Statement 10: The method of statement 9, further comprising selecting a frequency window from at least one well parameter and estimating a resonance frequency that fits within the frequency window.

Statement 11: The method of statements 9 or 10, further comprising producing a new shaped pulse from the estimated resonance frequency and broadcasting the new shaped pulse into the wellbore.

Statement 12: A well measurement system for determining cement bonding comprising: an acoustic logging tool, wherein the acoustic logging tool comprises: at least one transmitter, wherein the at least one transmitter is configured to broadcast a shaped signal; and at least one receiver, wherein the at least one receiver is configured to record a reverberating signal; a conveyance, wherein the conveyance is attached to the acoustic logging tool; and an information handling system, wherein the information handling system is configured to: process the reverberating signal; and determine presence of a material outside a casing string.

Statement 13: The system of statement 12, wherein the material comprises air, water, borehole fluid, gas, oil, or combinations thereof.

Statement 14: The system of statements 12 or 13, wherein the receiver is a segmented piezoelectric tube or an individual receiver.

Statement 15: The system of statements 12 to 14, wherein the transmitter is cylindrical or a segmented piezoelectric tube.

Statement 16: The system of statements 12 to 15, further comprising a feed back module, wherein the feed back module is configured to optimize the reverberating signal.

Statement 17: The system of statement 16, wherein the feed back module is further configured to select a frequency window from at least one well parameter and estimate a resonance frequency that fits within the frequency window.

Statement 18: The system of statements 15 to 17, wherein the feed back module is further configured to produce a new shaped pulse from the estimated resonance frequency and send the new shaped pulse to the at least one transmitter.

Statement 19: The system of statements 12 to 18, wherein the at least one receiver is disposed between and adjacent to two transmitters.

Statement 20: The system of statements 12 to 19, wherein the at least one transmitter is disposed between and adjacent to two receivers.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining cement bonding, comprising:
   disposing an acoustic logging tool in a wellbore and inside a pipe string at a first location, wherein the acoustic logging tool comprises a transmitter and a receiver disposed on the acoustic logging tool;
   broadcasting a shaped signal by the transmitter through the pipe string and through at least a first casing of one or more concentric pipes disposed around the pipe string;
   receiving a reverberating signal by the receiver;
   processing the reverberating signal by an information handling system;
   determining presence of a material outside an outermost of the one or more concentric pipes; and
   moving the acoustic logging tool to a second location inside the pipe string.

2. The method of claim 1, wherein the material comprises air, water, borehole fluid, gas, oil, cement, formation, or combinations thereof.

3. The method of claim 1, wherein the receiver is a segmented piezoelectric tube or an individual receiver.

4. The method of claim 1, wherein the transmitter is cylindrical or a segmented piezoelectric tube.

5. The method of claim 1, wherein the transmitter and the receiver are a single element.

6. The method of claim 1, wherein the reverberating signal is an air reverberation signal and wherein the air reverberation signal indicates air behind a first casing.

7. The method of claim 1, wherein the reverberating signal is a borehole fluid reverberation signal and wherein the borehole fluid reverberation signal indicates fluid behind a first casing.

8. The method of claim 1, wherein the reverberating signal is a cement reverberation signal and wherein the cement reverberation signal indicates cement behind a first casing.

9. The method of claim 1, further comprising optimizing the reverberating signal through a feed back loop.

10. The method of claim 9, further comprising selecting a frequency window from at least one well parameter and estimating a resonance frequency that fits within the frequency window.

11. The method of claim 10, further comprising producing a new shaped pulse from the estimated resonance frequency and broadcasting the new shaped pulse into the wellbore.

12. A well measurement system for determining cement bonding comprising:
    an acoustic logging tool, wherein the acoustic logging tool comprises:
    at least one transmitter, wherein the at least one transmitter is configured to broadcast a shaped signal from the acoustic logging tool and then through a pipe string and through a least a first casing at two or more locations in the pipe string; and
    at least one receiver, wherein the at least one receiver is configured to record a reverberating signal;
    a conveyance, wherein the conveyance is attached to the acoustic logging tool; and an information handling system, wherein the information handling system is configured to: process the reverberating signal; and
    determine presence of a material outside a casing string.

13. The well measurement system of claim 12, wherein the material comprises air, water, borehole fluid, gas, oil, cement, formation, or combinations thereof.

14. The well measurement system of claim 12, wherein the receiver is a segmented piezoelectric tube or an individual receiver.

15. The well measurement system of claim 12, wherein the transmitter is cylindrical or a segmented piezoelectric tube.

16. The well measurement system of claim 12, further comprising a feed back module, wherein the feed back module is configured to optimize the reverberating signal.

17. The well measurement system of claim 16, wherein the feed back module is further configured to select a frequency window from at least one well parameter and estimate a resonance frequency that fits within the frequency window.

18. The well measurement system of claim 17, wherein the feed back module is further configured to produce a new shaped pulse from the estimated resonance frequency and send the new shaped pulse to the at least one transmitter.

19. The well measurement system of claim 12, wherein the at least one receiver is disposed between and adjacent to two transmitters.

20. The well measurement system of claim 12, wherein the at least one transmitter is disposed between and adjacent to two receivers.

* * * * *